(12) United States Patent
Lin et al.

(10) Patent No.: US 8,723,819 B2
(45) Date of Patent: May 13, 2014

(54) METHOD FOR ANALYZING TWO-DIMENSIONAL TRACK TO GENERATE AT LEAST ONE NON-LINEAR INDEX AND TOUCH CONTROL MODULE USING THE SAME

(75) Inventors: Jao-Ching Lin, Taipei (TW); Wen-Ting Lee, Taipei County (TW); Chung-Yi Shen, Tainan (TW)

(73) Assignee: Sentelic Corporation, Neihu Dist., Taipei (TW)

( * ) Notice: Subject to any disclaimer, the term of this patent is extended or adjusted under 35 U.S.C. 154(b) by 679 days.

(21) Appl. No.: 12/891,382

(22) Filed: Sep. 27, 2010

(65) Prior Publication Data
US 2012/0075203 A1   Mar. 29, 2012

(51) Int. Cl.
G06F 3/041    (2006.01)

(52) U.S. Cl.
USPC .......................................... 345/173; 345/156

(58) Field of Classification Search
USPC .................. 345/156–158, 173–181, 684–688
See application file for complete search history.

(56) References Cited

U.S. PATENT DOCUMENTS

| | | | | |
|---|---|---|---|---|
| 6,711,280 B2* | 3/2004 | Stafsudd et al. | ............... | 382/106 |
| 7,446,754 B2* | 11/2008 | Ausbeck, Jr. | ................. | 345/156 |
| 7,724,267 B2* | 5/2010 | Yoshihara et al. | ............ | 345/650 |
| 7,817,145 B2* | 10/2010 | Klishko et al. | ................ | 345/173 |
| 8,441,452 B1* | 5/2013 | Fuller et al. | .................... | 345/173 |
| 2009/0136136 A1* | 5/2009 | Mori et al. | .................... | 382/187 |

* cited by examiner

*Primary Examiner* — Duc Dinh
(74) *Attorney, Agent, or Firm* — Winston Hsu; Scott Margo (57) ABSTRACT

A method for analyzing a two-dimensional track to generate at least one non-linear index and a touch control module using the same are provided. The method includes: extracting a two-dimensional track; generating a plurality of displacement units in sequence according to the two-dimensional track, in which each displacement unit includes a displacement amount and a displacement direction of the two-dimensional track moving in a preset time interval; comparing the displacement amount of each displacement unit with a reference value in sequence; calculating an included angle formed between the displacement direction of the displacement unit and a displacement direction of a previous displacement unit, when the displacement amount of the displacement unit is greater than the reference value; accumulating the included angles in sequence to obtain an accumulated angle, in which the accumulated angle includes an accumulated value and a positive or negative sign; and converting the accumulated angle to at least one non-linear index.

9 Claims, 12 Drawing Sheets

METHOD FOR ANALYZING TWO-DIMENSIONAL TRACK TO GENERATE AT LEAST ONE NON-LINEAR INDEX AND TOUCH CONTROL MODULE USING THE SAME

BACKGROUND OF THE INVENTION

1. Field of the Invention

The present invention relates to a method for recognizing gestures and a touch control module using the same, and more particularly to a touch control module, widely applied to various electronic devices as multi-functional touch control input, by using a non-linear index, which is obtained by accumulating included angles between continuous displacement units generated by gestures, as a reference of gesture existence and gesture functions.

2. Related Art

With development of touch control technology, a touch pad executing functions of a conventional mouse is increasingly widely applied to various electronic devices. During using, the conventional touch pad executes a function of moving a cursor or clicking specific options displayed on the screen by detecting a sliding track of an object (for example, a finger) on a surface, thereby replacing the conventional mouse.

However, as additional functions of electronic products tend to be complex, if the manipulating manners of the conventional touch pad, for example, the functions of moving the cursor and clicking the option, are still used, the complexity of an operating procedure will be inevitably greatly increased, which not only increases manipulating difficulties, but also lowers using willingness.

In order to lower the complexity of the operating procedure, the corresponding input functions are executed by using different gestures. During implementation, in the manipulating manner, a switching-on mode and an exiting mode, and corresponding relations between gestures and specific functions need to be preset. In other words, special functions of the special gesture input (for example, clicking, double clicking, dragging, window scrolling, window zooming, and window rotation in the window system) can be recognized according to the sliding track on the touch pad.

However, during the practical operation, the manner has the following disadvantages. Firstly, due to the switching-on mode and the exiting mode, the manipulating complexity is increased; secondly, as gesture types are increased, the user needs to memorize corresponding relations between the gestures and the specific functions, and the quantity of the gesture determining loops and the comparison circuits needs to be increased accordingly, thereby wasting the operation space, occupying the circuit design space, and increasing the power consumption of the electronic device.

For the switching-on mode and the exiting mode, an independent region is divided from the surface of the touch pad, for providing manipulation of specific functions. Taking the page scrolling as an example, a specific region may be divided from the surface of the touch pad, when manipulating in the specific region by using the specific gestures, the user may scroll the page for browsing. However, the manipulating manner is only applied to the page scrolling in a vertical direction, and has a poor manipulating efficiency.

Accordingly, in order to eliminate the disadvantages, the inventor of the present invention proposes a method for analyzing a two-dimensional track to generate at least one non-linear index and a touch control module using the same, such that the user may manipulate various functions by using simple gestures, thereby optimizing the operating efficiency of touch control.

SUMMARY OF THE INVENTION

The present invention is mainly directed to a method for analyzing a two-dimensional track to generate at least one non-linear index and a touch control module using the same, such that a user may manipulate various functions by using simple gestures, thereby optimizing an operating efficiency of touch control.

In order to achieve the objectives, the present invention provides a method for analyzing a two-dimensional track to generate at least one non-linear index. The method includes: extracting a two-dimensional track, in which the two-dimensional track is a two-dimensional coordinate position sequenced along with time; generating a plurality of displacement units in sequence according to the two-dimensional track, in which each displacement unit includes a displacement amount and a displacement direction of the two-dimensional track moving in a preset time interval; comparing the displacement amount of each displacement unit with a reference value in sequence; calculating an included angle formed between the displacement direction of the displacement unit and a displacement direction of a previous displacement unit, when the displacement amount of the displacement unit is greater than the reference value; accumulating the included angles in sequence to obtain an accumulated angle, in which the accumulated angle includes an accumulated value and a positive or negative sign; and converting the accumulated angle to at least one non-linear index.

In addition, the present invention provides a touch control module, which includes a sensing surface and a controller. The sensing surface has a plurality of proximity sensors distributed on a surface thereof, for sensing contact of at least one object on the sensing surface. The controller is electrically connected to the plurality of proximity sensors, for determining a plurality of groups of first displacements and second displacements of each object sliding on the sensing surface, calculating an included angle between the second displacement and the first displacement in each group, accumulating the included angles to obtain an accumulated angle, and outputting at least one non-linear index according to the accumulated angle; in which the second displacement of each group is determined after the first displacement, and the accumulated angle includes an accumulated value and a positive or negative sign.

During implementation, the touch control module detects a contact position and a contact time of the object on the sensing surface, and determines the non-linear index according to the contact position, the contact time, and the accumulated angle.

In order to make features and efficacies of the present invention more comprehensible, a detailed description of the present invention is given below by reference to accompanying drawings.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
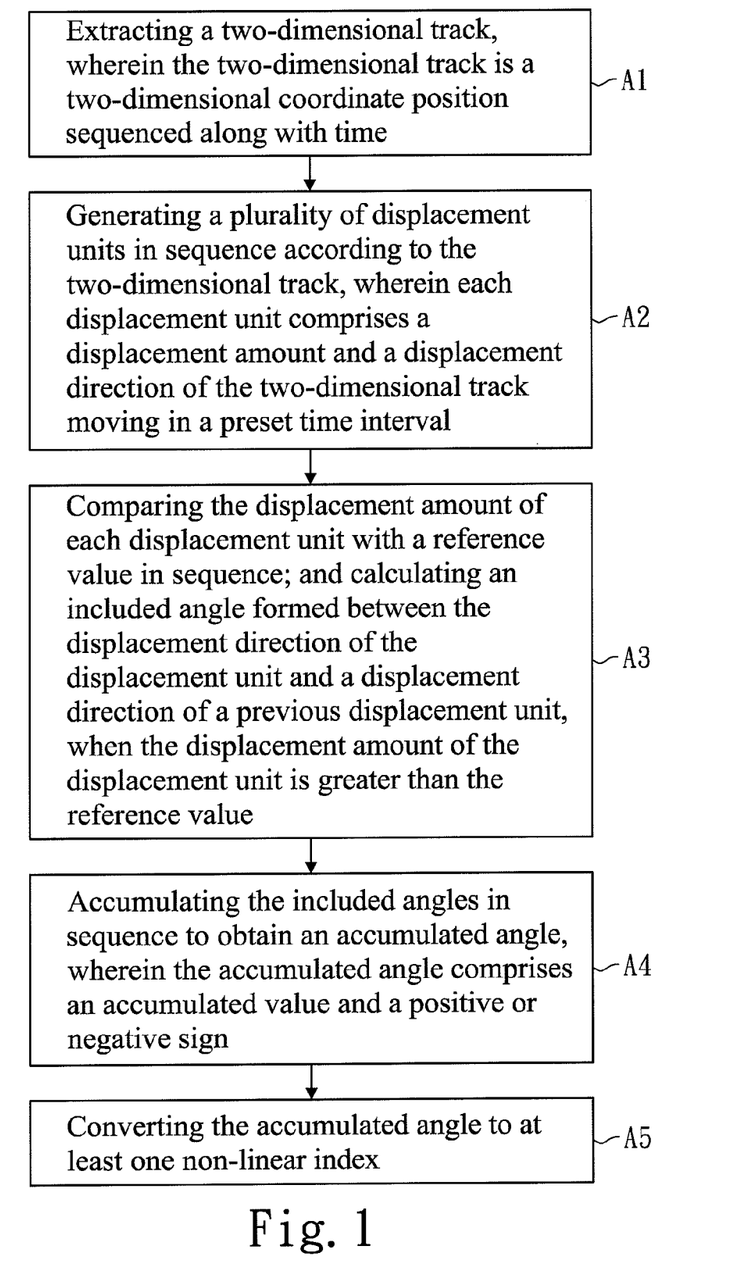
FIG. 1 is a flow chart of a method for analyzing a two-dimensional track to generate at least one non-linear index according to the present invention.
Figure 2:
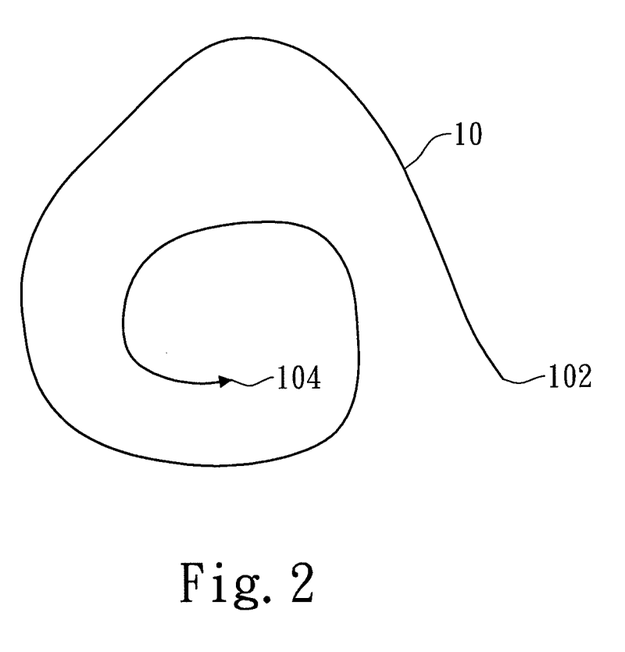
FIG. 2 is a schematic view of Step A1 in a method for analyzing a two-dimensional track to generate at least one non-linear index according to the present invention.

Referring to FIG. 1, it is a flow chart of a method for analyzing a two-dimensional track to generate at least one non-linear index according to the present invention In Step A1, as shown in FIG. 2, firstly, a two-dimensional track 10 is extracted. The two-dimensional track 10 is a two-dimensional coordinate position sequenced along with time, and includes a start point 102 and an end point 104. Two-dimensional coordinates may be described by using different coordinate systems (for example, a rectangular coordinate system or a cylindrical coordinate system); in other words, one point on the contact sensing surface is used as an origin. The two-dimensional track 10 represents at least a part of a sliding track of an object (for example, a finger) operated by a user on a contact sensing surface; that is to say, the two-dimensional track is extracted in any segment of a sliding time interval in the sliding track.

In addition, the extracting of the two-dimensional track may be activated through the following modes. In a first mode, when it is detected that the object contacts with the contact sensing surface for a first time, the two-dimensional track is started to be extracted. In a second mode, when it is detected that the object continuously contacts with the contact sensing surface for a period of time (preset time), the two-dimensional track is started to be extracted. In a third mode, when it is detected that the object contacts with a specific region of the contact sensing surface (for preset time), the two-dimensional track is started to be extracted.

Figure 3:
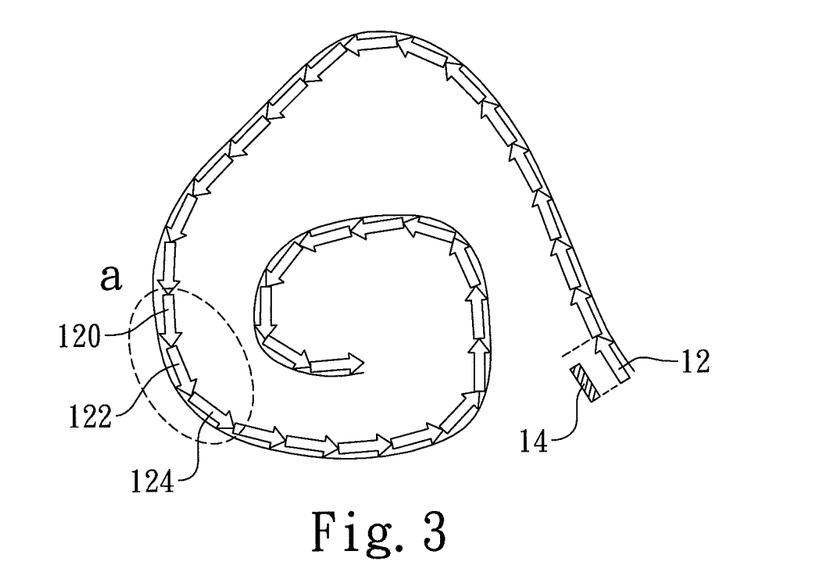
FIG. 3 is a schematic view of Step A2 in a method for analyzing a two-dimensional track to generate at least one non-linear index according to the present invention.

In Step A2, as shown in FIG. 3, a plurality of displacement units 12 is generated in sequence according to the two-dimensional track 10, in which each displacement unit 12 includes a displacement amount and a displacement direction of the two-dimensional track 10 moving in a preset time interval. Generation time of different displacement units 12 as shown in FIG. 3 is not repeated, but an implementation scope of the displacement units of the present invention is not limited thereto, in which although each displacement unit 12 is generated in a precedence order, the generation time may be repeated, that is, an end point time of the previous displacement unit may be later than a start point time of a next displacement unit.

Afterwards, in Step A3, the displacement amount of each displacement unit 12 is compared with a reference value segment 14 in sequence; and when the displacement amount of the displacement unit 12 is greater than a length of the reference value segment 14, an included angle formed between the displacement direction of the displacement unit and a displacement direction of a previous displacement unit is calculated. Accordingly, when it is determined that the displacement amounts of the displacement units 120, 122, and 124 are greater than the reference value, an included angle θ1 between the displacement units 120 and 122 and an included angle θ2 between the displacement units 122 and 124 are calculated.

Figure 3A:
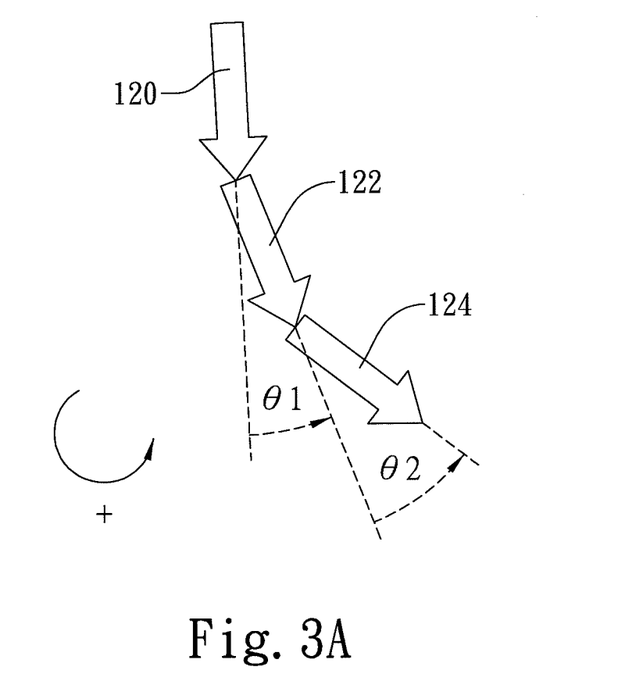
FIG. 3A is a schematic view of Step A3 in a method for analyzing a two-dimensional track to generate at least one non-linear index according to the present invention.

Finally, in Steps A4 and A5, the included angles are accumulated in sequence, so as to obtain an accumulated angle, in which the accumulated angle includes an accumulated value and a positive or negative sign; and the accumulated angle is converted to at least one non-linear index. In this embodiment, as shown in FIG. 3A, an anticlockwise direction is preset as a positive angle, such that θ1, θ2 are positive.

In addition, the accumulated angle is converted to the non-linear index in many manners. For example, a threshold value may be set, and when the accumulated value of the accumulated angle exceeds the threshold value, the accumulated angle is converted to the non-linear index according to the positive or negative sign. Further, the accumulated angle is converted to the non-linear index through a formula. The non-linear index represents a corresponding control signal, so as to manipulate specific functions.

Figure 4:
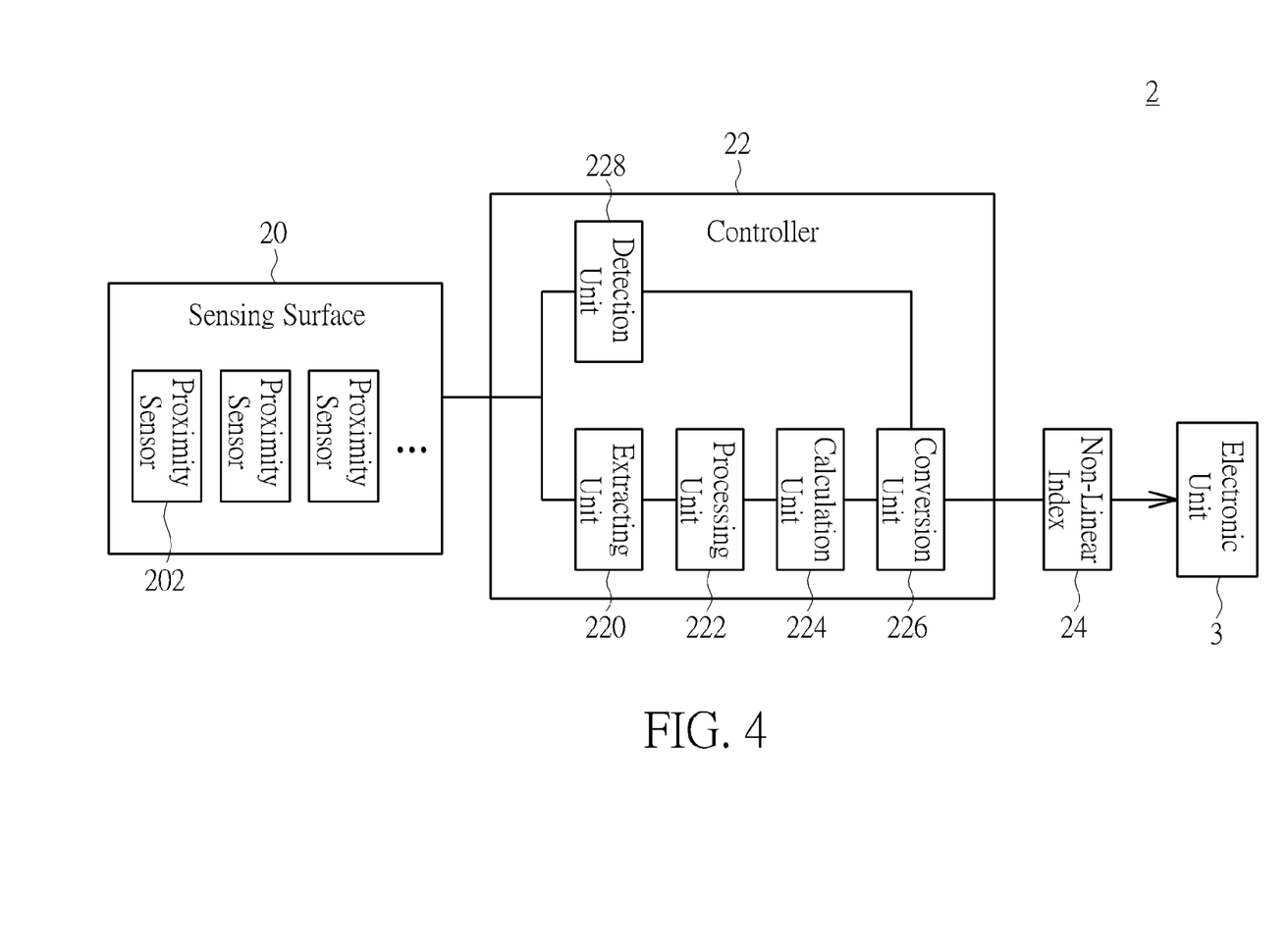
FIG. 4 is a schematic structural view of a first embodiment of a touch control module according to the present invention.

In addition, the present invention further provides a touch control module. Referring to FIG. 4, it is a schematic structural view of a first embodiment of the touch control module.

As shown in the drawing, in the first embodiment, the touch control module 2 includes a sensing surface 20 and a controller 22. A plurality of proximity sensors 202 is distributed on a surface of the sensing surface 20, and a plurality of sensing regions is disposed, in which the proximity sensors 202 are used to sense contact of at least one object (for example, a finger) on the sensing surface 20. The controller 22 is electrically connected to the plurality of proximity sensors 202, and has an extracting unit 220, a processing unit 222, a calculation unit 224, a conversion unit 226, and a detection unit 228.

The extracting unit 220 is used to extract a two-dimensional track 10 (as shown in FIG. 2). The extracted two-dimensional track 10 is processed by the processing unit 222 in sequence to obtain a plurality of groups of first and second displacements, in which the second displacement of each group is determined after the first displacement. Afterwards, the calculation unit 224 calculates an included angle between the second displacement and the first displacement of each group, and accumulates the included angles to obtain an accumulated angle, in which the accumulated angle includes an accumulated value and a positive or negative sign. Finally, the conversion unit 226 outputs at least one non-linear index 24 according to the accumulated angle.

The non-linear index may be a control signal controlling an electronic device, or a signal to be read by a computer system, so as to achieve a controlling objective. In addition, the first displacement of each group is a difference between positions of the object contacting with the sensing surface at two time points, the second displacement of each group is a difference between positions of the object contacting with the sensing surface at another two time points, and the time points of the second displacement are later than the time points of the first displacement.

As described above, the conversion unit 226 may convert the accumulated angle and output the non-linear index in many manners. For example, a threshold value may be preset, and when the accumulated value of the accumulated angle exceeds the threshold value, the accumulated angle is converted to the non-linear index according to the positive or negative sign; or the accumulated angle is converted to the non-linear index through a formula.

During implementation, the threshold value is set with reference to a spatial distribution situation of the plurality of proximity sensors 202 on the sensing surface 20. For example, if a distribution pitch of the plurality of proximity sensors 202 is approximately a width of the finger, the threshold value may be set to 90 degrees; and if the distribution pitch of the plurality of proximity sensors 202 is approximately smaller than a half of the width of the finger width, the threshold value is set to be a smaller numerical value, for example, 45 degrees.

In addition, during implementation, the detection unit 228 detects a contact position and a contact time of the object on the sensing surface 20, and the controller 20 determines a type of the non-linear index according to the contact position, the contact time, and the accumulated angle, so as to execute specific corresponding functions.

Figure 5A:
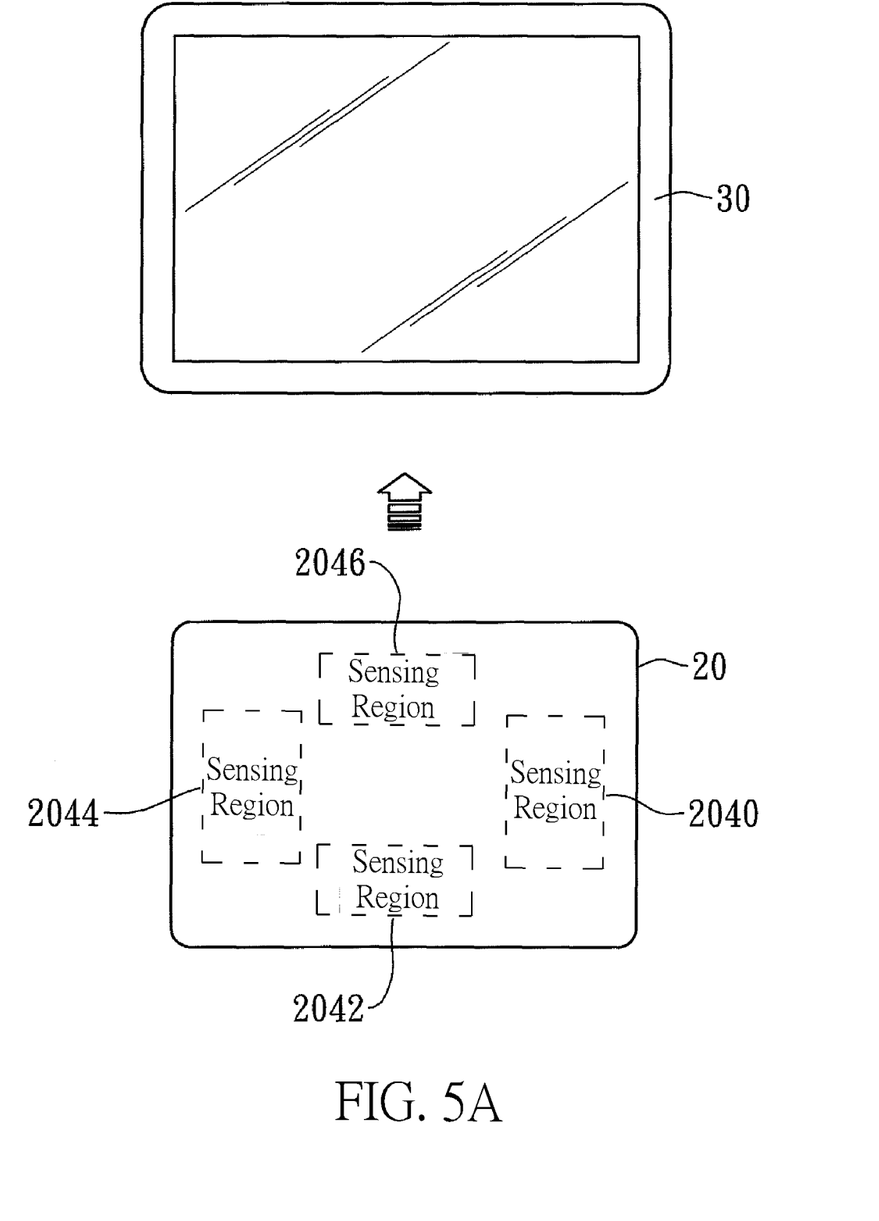
FIGS. 5A to 5E are schematic views of using the first embodiment of the touch control module according to the present invention.

Referring to FIGS. 5A to 5E, schematic views of using the touch control module are shown. As shown in FIG. 5A, four sensing regions 2040, 2042, 2044, and 2046 are disposed on the surface of the sensing surface 20. During operation, the controller (not shown) determines the type of the generated non-linear index according to the sensing region of a start position of the two-dimensional track.

During implementation, as shown in FIGS. 5B to 5E, a user may manipulate the following four functions on a screen 30 of an electronic device 3 by using the touch control module, in which the four functions are page scrolling in a vertical direction, page scrolling in a horizontal direction, image rotation, and image zoom in/zoom out.

Figure 5B:
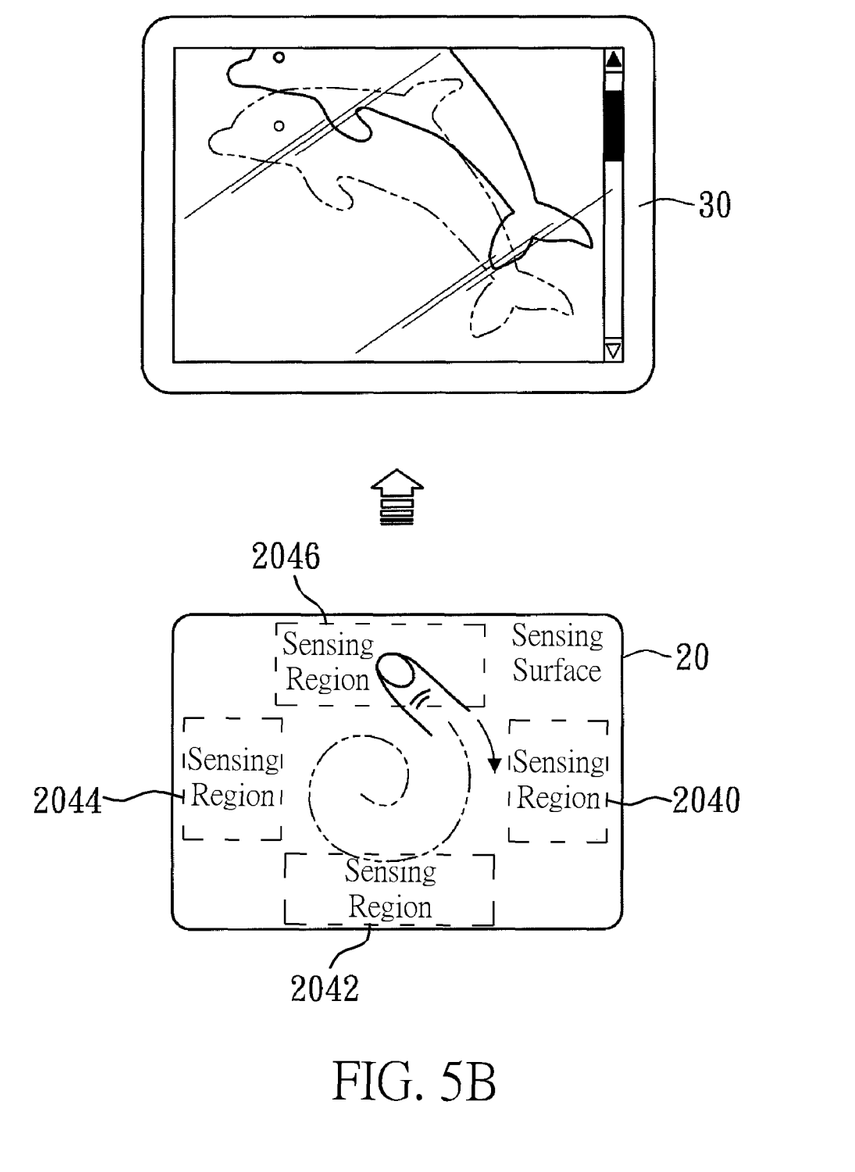

As shown in FIG. 5B, the sensing region 2046 on an upper part of the sensing surface 20 is preset to manipulate the displayed image to scroll in the vertical direction, and the object firstly contacts with the sensing region 2046 and then slides for a two-dimensional track. When the accumulated value of the two-dimensional track exceeds a threshold value, the accumulated angle is respectively converted to a control signal used to control the image on the screen 30 to be scrolled downwards or upwards according to the positive or negative sign of the accumulated angle.

Similarly, the accumulated angle may be respectively converted to a control signal used to control a page displayed on the screen 30 to be paged down or up according to the positive or negative sign of the accumulated angle; or a control signal used to control an item displayed on the screen 30 to be displayed towards a previous item or a next item according to the positive or negative sign of the accumulated angle.

Figure 5C:
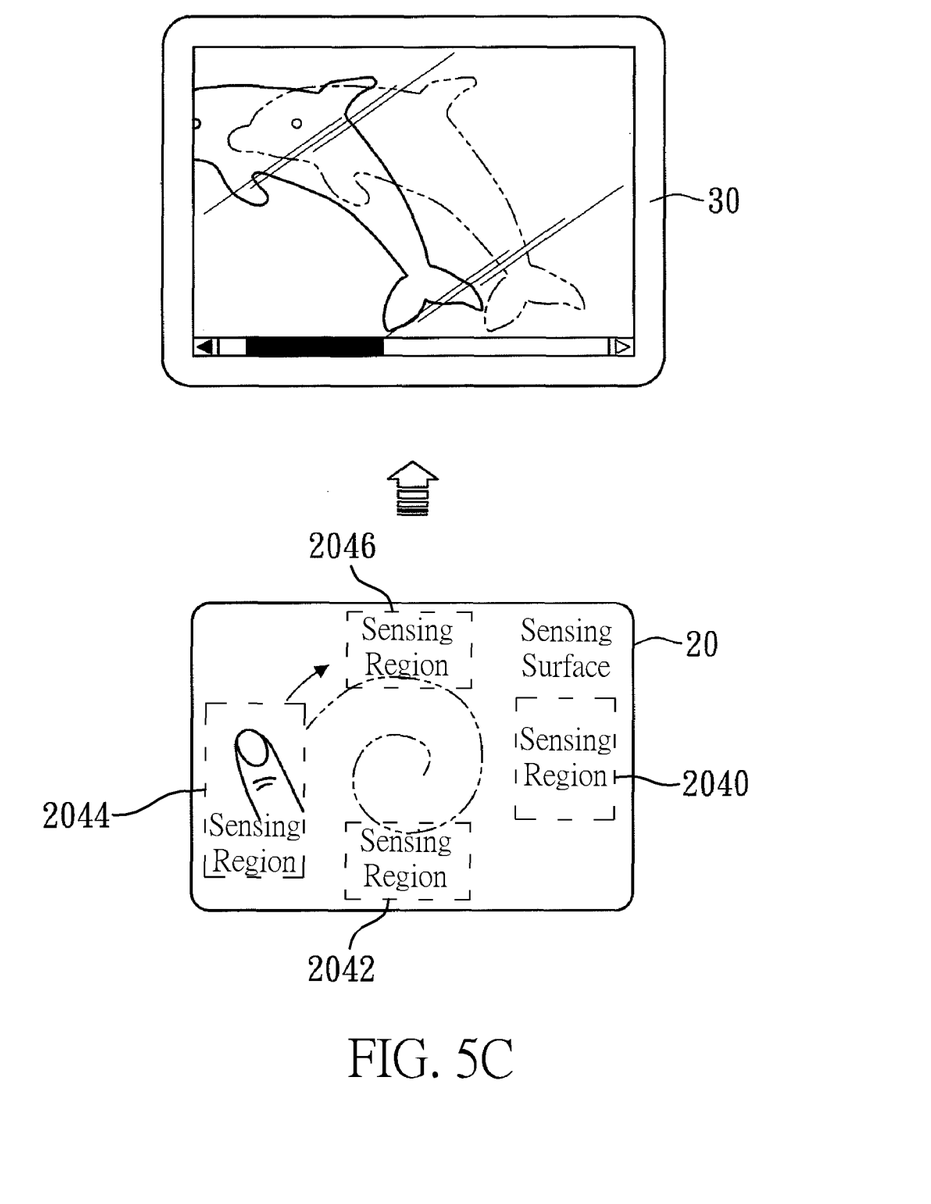

FIG. 5C shows the manipulation of another function. The sensing region 2044 on a left part of the sensing surface 20 is preset to manipulate the displayed image to scroll in the horizontal direction, and the object firstly contacts with the sensing region 2044 and then slides for a two-dimensional track. When the accumulated value of the two-dimensional track exceeds a threshold value, the accumulated angle is converted to a control signal used to control the image to be scrolled left or right according to the positive or negative sign of the accumulated angle.

Similarly, the accumulated angle may be respectively converted to a control signal used to control a page displayed on the screen 30 to be paged down or up according to the positive or negative sign of the accumulated angle.

In the first embodiment, for the page scrolling controlled by gestures, an object (that is, a finger) is set as an example, and the controlled page scrolling has a uniform speed. In other words, the controller only determines the direction of the page scrolling, but does not determine the speed. However, as the quantity of the objects manipulated by the gestures is increased, the speed of the page scrolling may be further controlled. For example, the detection unit is used to detect the quantity of the objects, and as the quantity of the objects (for example, the quantity of the fingers) is increased or decreased, the speed of the page scrolling is proportionally increased or decreased.

Figure 5D:
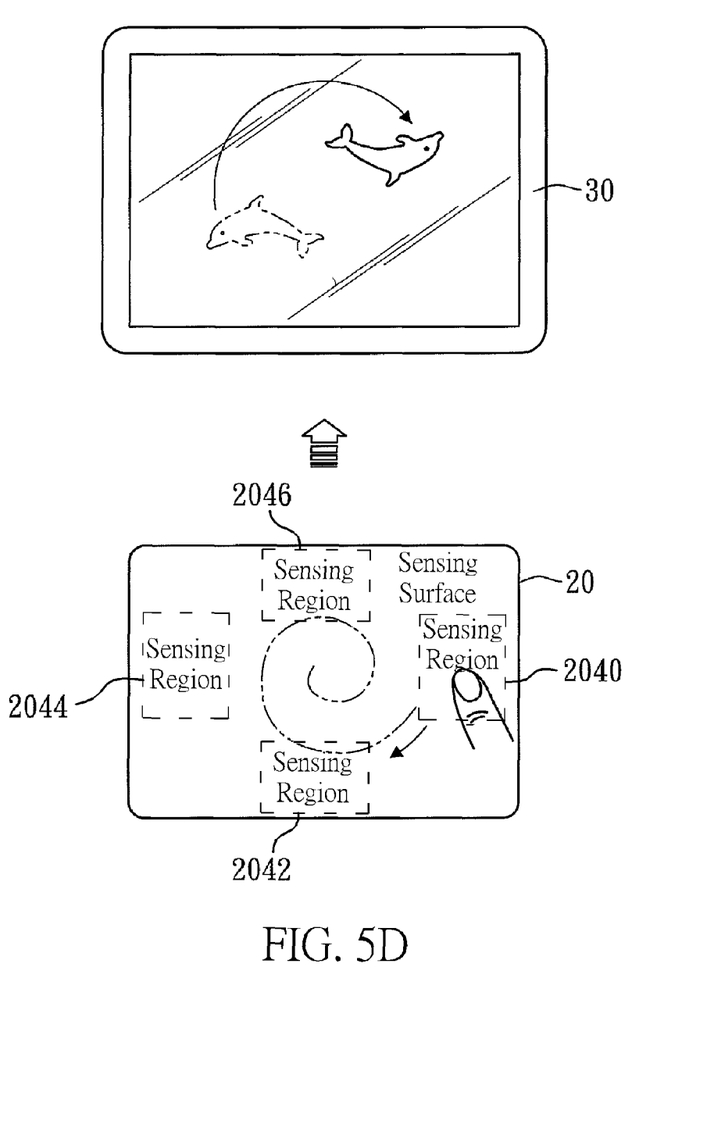

FIG. 5D shows the manipulation of the displayed image rotation function. The sensing region 2040 on a right part of the sensing surface 20 is preset as the region corresponding to the function, and the object firstly contacts with the sensing region 2040 and then slides for a two-dimensional track. When the accumulated value of the two-dimensional track exceeds a threshold value, the accumulated angle is converted to a control signal used to control the image on the screen 30 to be rotated clockwise or anticlockwise according to the positive or negative sign of the accumulated angle.

Figure 5E:
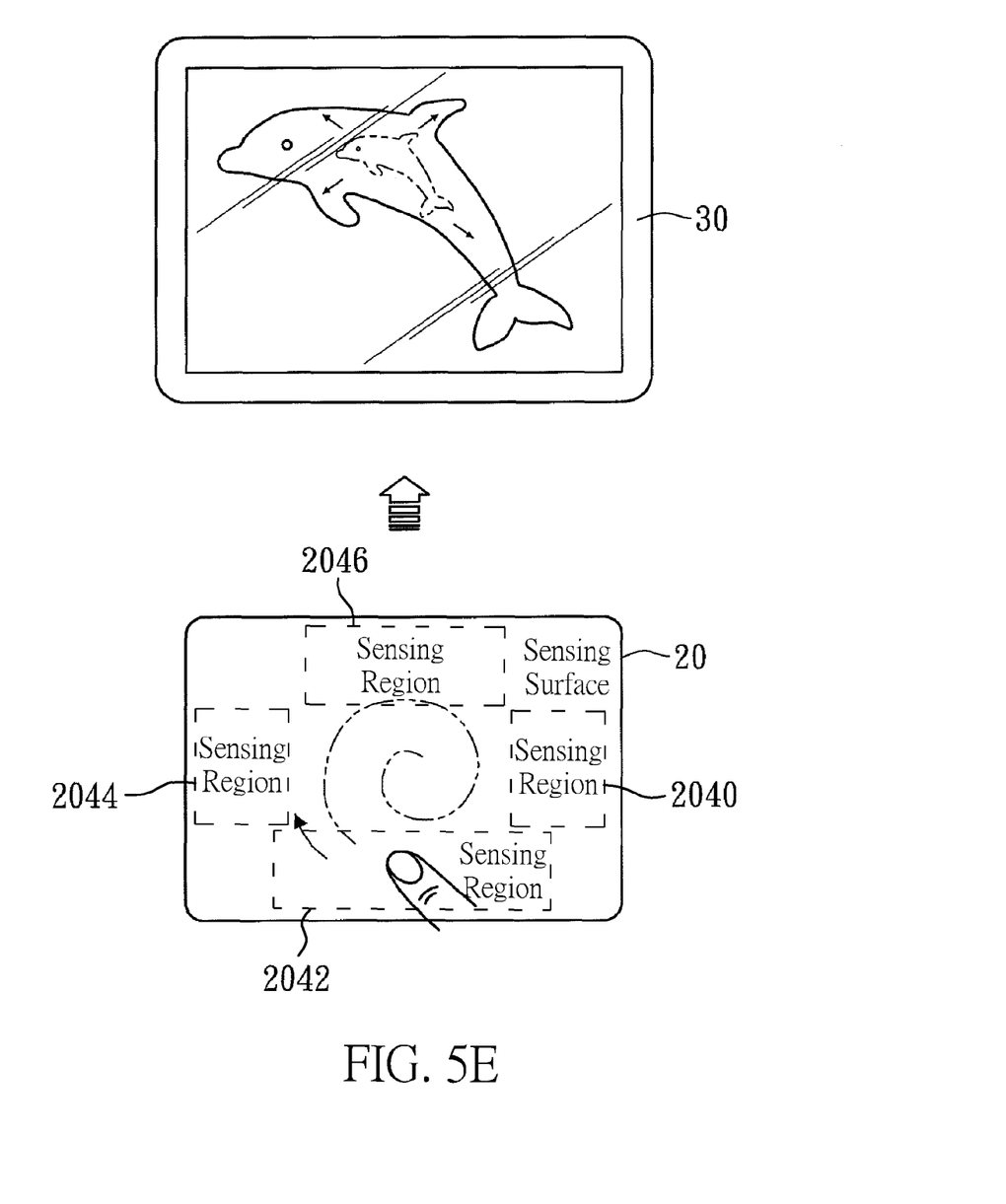

FIG. 5E shows the manipulation of the displayed image zoom in/zoom out function. The sensing region 2042 on a lower part of the sensing surface 20 is preset as the region corresponding to the function, and the object firstly contacts with the sensing region 2042 and then slides for a two-dimensional track. When the accumulated value of the two-dimensional track exceeds a threshold value, the converted non-linear index is respectively a control signal used to control the image on the screen 30 to be zoomed in or out.

For the manipulation of the image rotation function and the image zoom in/zoom out function, in addition to the above manner of presetting the threshold value to determine the type of the control signal represented by the non-linear index, the control signal may be further defined according to the accumulated value of the accumulated angle. For example, for the image rotation, in addition to controlling the image to be rotated clockwise or anticlockwise by using a clockwise or anticlockwise gesture, a rotation angle (for example, 90, 180, and 270 degrees) in a certain direction may be determined according to the accumulated value of the accumulated angle. In addition, for the image zoom in/zoom out function, a multiplying factor of the image zoom in/zoom out may be determined according to the accumulated value of the accumulated angle.

Figure 6:
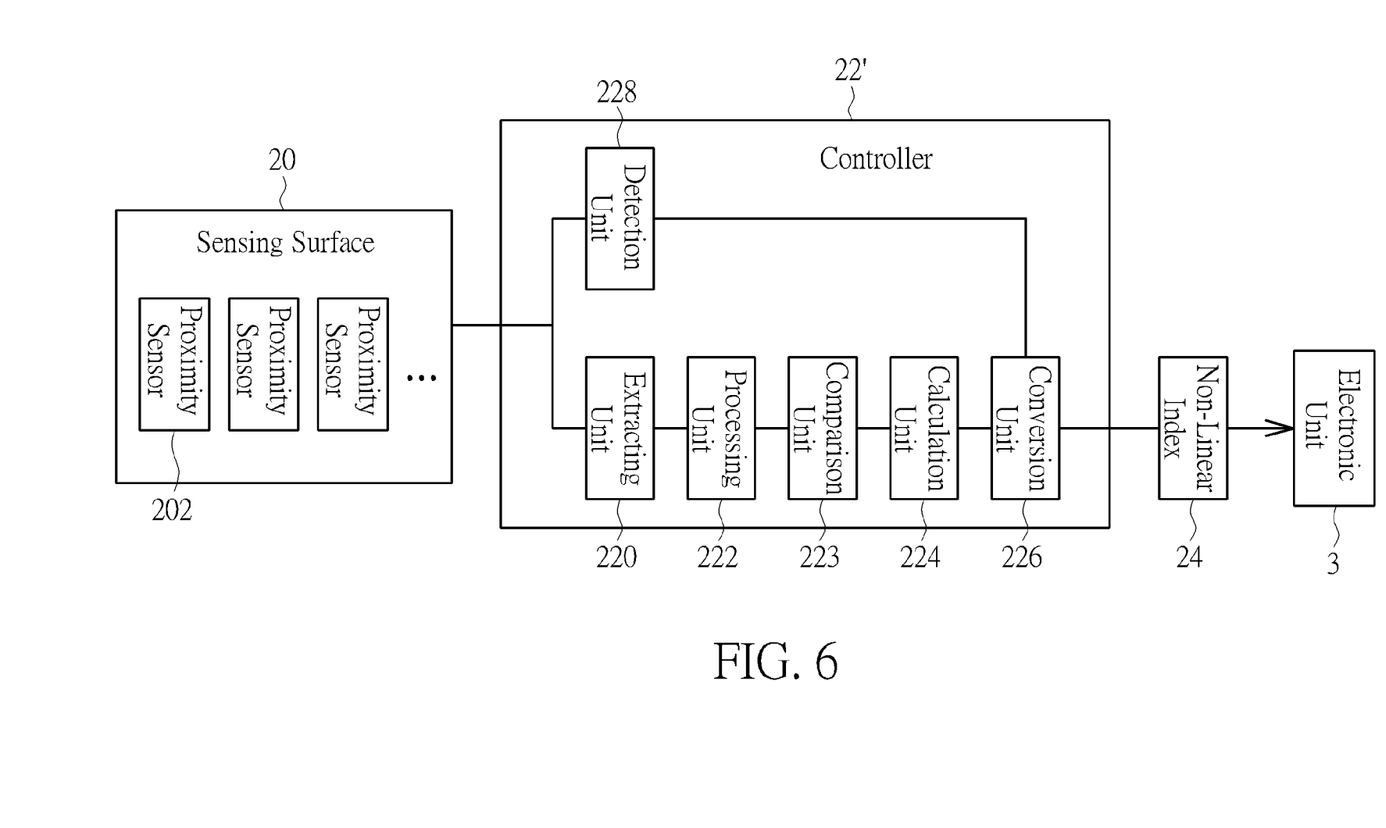
FIG. 6 is a schematic structural view of a second embodiment of a touch control module according to the present invention.

Referring to FIG. 6, it is a schematic structural view of a second embodiment of a touch control module according to the present invention. In this embodiment, in addition to an extracting unit 220, a processing unit 222, a calculation unit 224, a conversion unit 226, and a detection unit 228, the controller 22' further includes a comparison unit 223.

The processing unit 222 is used to process a two-dimensional track obtained by the extracting unit 220 in sequence to obtain a plurality of displacement units. Afterwards, the comparison unit 223 compares a displacement amount of each displacement unit with a reference value. When a displacement amount of a displacement unit is greater than the reference value, the calculation unit 224 calculates an angle formed between a displacement direction of the displacement unit and a displacement direction of a previous displacement unit, and accumulates the angles to obtain an accumulated angle.

In addition, when a quantity of objects used to manipulate the touch control device exceeds one, an extracting standard of the two-dimensional track may be preset, that is, the tracks generated by a part of the objects in the plurality of objects are selectively extracted. During the implementation, the following four aspects are used for exemplary illustration.

Figure 7A:
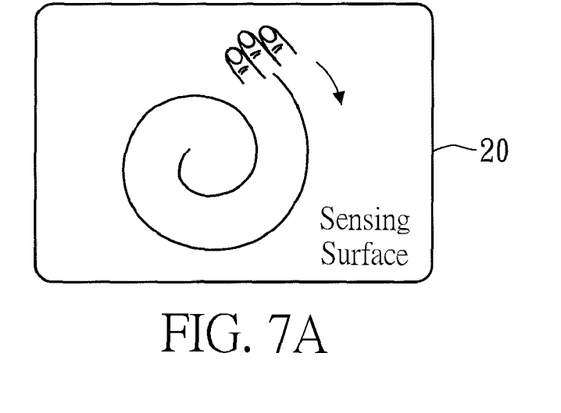
FIGS. 7A to 7C are schematic view of using a touch control module according to the present invention when performing touch control operations by a plurality of objects.

In a first manner, the two-dimensional track generated by a center of mass or a geographic center of the plurality of objects is extracted as a displacement determination standard, so as to obtain the corresponding non-linear index. In other words, the first displacement of each group is a difference between center positions of the plurality of objects contacting with the sensing surface at two time points; and the second displacement of each group is a difference between center positions of the plurality of objects contacting with the sensing surface at another two time points, in which the time points of the second displacement are later than the time points of the first displacement. Taking FIG. 7A as an example, the user performs the touch control by using three fingers, but the extracted two-dimensional track is generated by the finger located in the middle.

Figure 7B:
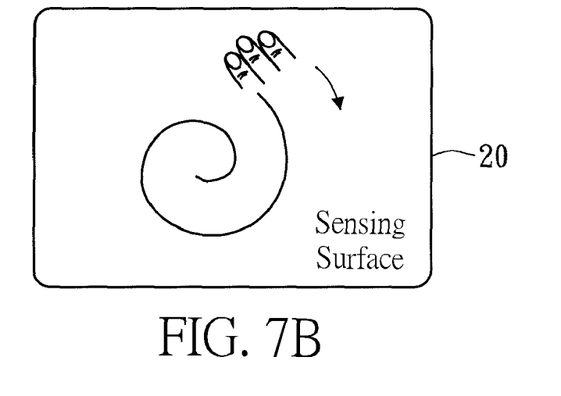

In a second manner, the two-dimensional track generated by a left edge position of the plurality of objects is extracted as a displacement determination standard. In other words, the first displacement of each group is a difference between left edge positions of the plurality of objects contacting with the sensing surface at two time points; and the second displacement of each group is a difference between left edge positions of the plurality of objects contacting with the sensing surface at another two time points, in which the time points of the second displacement are later than the time points of the first displacement. Taking FIG. 7B as an example, the extracted two-dimensional track is generated by the finger located on the left position.

Figure 7C:
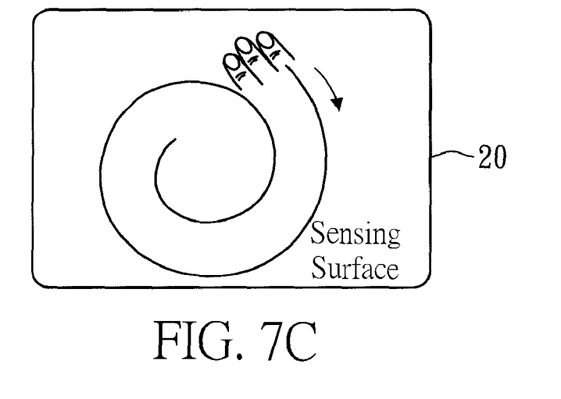

In a third manner, the two-dimensional track generated by a right edge position of the plurality of objects is extracted as a displacement determination standard. In other words, the first displacement of each group is a difference between right edge positions of the plurality of objects contacting with the sensing surface at two time points; and the second displacement of each group is a difference between right edge positions of the plurality of objects contacting with the sensing surface at another two time points, in which the time points of the second displacement are later than the time points of the first displacement. Taking FIG. 7C as an example, the extracted two-dimensional track is generated by the finger located on the right position.

In a fourth manner, the two-dimensional track generated by each object is respectively received and processed to obtain a plurality of groups of first displacements and second displacements, and an accumulated value of an accumulated angle is calculated. Afterwards, the accumulated values of the accumulated angles of the plurality of objects are compared, and the accumulated angle with the greater accumulated value is converted to the non-linear index, thereby executing the specific manipulating function.

To sum up, the present invention surely achieves the anticipated objective, and provides a method for analyzing a two-dimensional track to generate at least one non-linear index and a touch control module using the same, such that a user may manipulate various functions by using simple gestures, thereby optimizing an operating efficiency of touch control. Therefore, the present invention has industrial applicability, and the applicant files for a patent according to the provisions of the Patent Act.

The above description and drawings are only used to describe the embodiments of the present invention, and persons skilled in the art may make equivalent partial variations and modifications without departing from the technology and the spirit of the present invention.

What is claimed is:

1. A method for analyzing a two-dimensional track to generate at least one non-linear index, comprising:

A1: extracting a two-dimensional track, wherein the two-dimensional track is a two-dimensional coordinate position sequenced along with time;

A2: generating a plurality of displacement units in sequence according to the two-dimensional track, wherein each displacement unit comprises a displacement amount and a displacement direction of the two-dimensional track moving in a preset time interval;

A3: comparing the displacement amount of each displacement unit with a reference value in sequence; and calculating an included angle formed between the displacement direction of the displacement unit and a displacement direction of a previous displacement unit, when the displacement amount of the displacement unit is greater than the reference value;

A4: accumulating the included angles in sequence to obtain an accumulated angle, wherein the accumulated angle comprises an accumulated value and a positive or negative sign; and A5: converting the accumulated angle to at least one non-linear index.

2. The method according to claim 1, wherein in Step A5, when the accumulated value exceeds a threshold value, the accumulated angle is converted to the non-linear index according to the positive or negative sign.

3. The method according to claim 1, wherein in Step A5, the accumulated angle is converted to the non-linear index through a formula.

4. The method according to claim 1, wherein the two-dimensional track is at least a part of a sliding track of an object on a contact sensing surface.

5. The method according to claim 4, wherein one point on the contact sensing surface is used as an origin point of two-dimensional coordinates.

6. The method according to claim 4, wherein in Step A1, when the object first contacts with the contact sensing surface for a first time, the two-dimensional track is started to be extracted.

7. The method according to claim 4, wherein in Step A1, the two-dimensional track is extracted in any segment of a sliding time interval during the sliding track.

8. A touch control module, comprising:
a sensing surface, having a plurality of proximity sensors distributed on a surface, for sensing contact of at least one object on the sensing surface; and
a controller, electrically connected to the plurality of proximity sensors, for determining a plurality of groups of first displacements and second displacements of each object sliding on the sensing surface, calculating an included angle between the second displacement and the first displacement of each group, accumulating the included angles to obtain an accumulated angle, and outputting at least one non-linear index according to the accumulated angle;
wherein the first displacement of each group is a difference between positions of the object contacting with the sensing surface at two time points, the second displacement of each group is a difference between positions of the object contacting with the sensing surface at another two time points, and the time points of the second displacement are later than the time points of the first displacement, and wherein the second displacement of each group is determined after the first displacement, and the accumulated angle comprises an accumulated value and a positive or negative sign.

9. A touch control module, comprising:
a sensing surface, having a plurality of proximity sensors distributed on a surface, for sensing contact of at least one object on the sensing surface; and a controller, electrically connected to the plurality of proximity sensors, for determining a plurality of groups of first displacements and second displacements of each object sliding on the sensing surface, calculating an included angle between the second displacement and the first displacement of each group, accumulating the included angles to obtain an accumulated angle, and outputting at least one non-linear index according to the accumulated angle;

wherein the second displacement of each group is determined after the first displacement, and the accumulated angle comprises an accumulated value and a positive or negative sign and the time points of the second displacement are later than the time points of the first displacement;

wherein an amount of objects contacting with the sensing surface is greater than 1; the first displacement of each group is a difference between center positions of the plurality of objects contacting with the sensing surface at two time points and the second displacement of each group is a difference between center positions of the plurality of objects contacting with the sensing surface at another two time points, or the first displacement of each group is a difference between left edge positions of the plurality of objects contacting with the sensing surface at two time points and the second displacement of each group is a difference between left edge positions of the plurality of objects contacting with the sensing surface at another two time points, or the first displacement of each group is a difference between right edge positions of the plurality of objects contacting with the sensing surface at two time points, the second displacement of each group is a difference between right edge positions of the plurality of objects contacting with the sensing surface at another two time points.

* * * * *